United States Patent [19]

LaMothe

[11] 4,352,962
[45] Oct. 5, 1982

[54] TONE RESPONSIVE DISABLING CIRCUIT

[75] Inventor: Hilary LaMothe, Shenandoah, Ga.

[73] Assignee: Reliance Electric Company, Cleveland, Ohio

[21] Appl. No.: 163,929

[22] Filed: Jun. 27, 1980

[51] Int. Cl.³ ............................................. H04B 3/20
[52] U.S. Cl. ................................. 179/170 R; 179/170.2
[58] Field of Search ............ 179/170 R, 170.2, 170.4, 179/170.6, 170.8, 175.31 E

[56] References Cited

U.S. PATENT DOCUMENTS

| | | | |
|---|---|---|---|
| 3,069,501 | 12/1962 | Gilman et al. | 179/170.2 |
| 3,647,993 | 3/1972 | Foulkes et al. | 179/170.2 |
| 3,935,403 | 1/1976 | Penicaud et al. | 179/170.2 |
| 4,115,668 | 9/1978 | Skrovanek et al. | 179/170.2 |
| 4,177,361 | 12/1979 | Birck | 179/170.2 |
| 4,194,092 | 3/1980 | Luder | 179/170.4 |

Primary Examiner—Bernard Konick
Assistant Examiner—Randall P. Myers
Attorney, Agent, or Firm—Michael M. Rickin; Roy F. Hollander

[57] ABSTRACT

A tone responsive disabling circuit for disabling prior to the transmission of data on a telephone transmission line a device which is connected to the line for improving voice transmission on the line. The disabling circuit operates in response to the transmission on the line of a tone signal whose frequency falls within a predetermined band width and which also has a predetermined amplitude and minimum duration. The disabling circuit processes the signal transmitted on the line to generate two control signals. One of the control signals is a function of the transmission line signal. The other is a function of the energy contained in the transmission line signal which lies in a predetermined frequency band which is not the tone frequency band. When the control signal which is a function of the transmission line signal is greater in amplitude than both a reference signal and the energy related control signal, a phase locked loop is enabled to capture the tone signal and disable the voice improving device.

24 Claims, 4 Drawing Figures

TONE RESPONSIVE DISABLING CIRCUIT

BACKGROUND OF THE INVENTION

1. Field of the Invention

The present invention relates to circuitry for affecting the transmission characteristics of a voice frequency improving device such as a repeater and more particularly to circuitry which on sensing a tone of a predetermined frequency and predetermined duration disables the normal operation of the repeater to thereby permit transmission of data through the repeater.

2. Description of the Prior Art

In communication systems wherein voice signals are transmitted over substantial distances through transmission lines, it is necessary to provide circuitry which can compensate for the attenuation of the signals by the transmission line. In telephone systems, for example, it is necessary to provide amplifier circuits or repeaters to maintain satisfactory signal transmission through telephone lines which, in the absence of such circuits, would excessively attenuate the signals transmitted therethrough.

In the development of circuitry for transmitting voice frequency signals over transmission lines, a variety of types of repeater circuits have been employed. One of these types of repeater circuits is a repeater having a series amplifying network for inserting, in series with the transmission line, an amplifying voltage which varies in accordance with the signal voltage across the transmission line and a shunt amplifying network for inserting, in shunt with the transmission line, an amplifying current which varies in accordance with the signal current through the transmission line. The amplifying voltage is inserted in the transmission line in aiding relationship to the signal voltage transmitted by the then dominant or louder talking party and in opposing relationship to the then nondominant or softer talking party. The amplifying current is inserted in the transmission line in aiding relationship to the signal current transmitted by the then dominant or louder talking party and in opposing relationship to the then nondominant or softer talking party. A direction detector is connected to the transmission line in a manner such that the dominant direction of transmission is determined to thereby insert the voltage and current to aid the dominant party.

In such repeaters, it may be shown that if the ratio of amplifying voltage to signal voltage is equal in magnitude, but opposite in sign to the ratio of amplifying current to signal current, the circuit may function as an impedance matching circuit. It may also be shown that if the above ratios are equal in magnitude and have the same sign, then the circuit may function as a repeater which compensates for the frequency independent attenuation of loaded transmission lines or the frequency dependent attenuation of nonloaded transmission lines. One such repeater which compensates for the attenuation of signals in a loaded transmission line is shown and described in U.S. Pat. No. 3,706,862 granted in the name of C. W. Chambers, Jr. on Dec. 19, 1972. A repeater which compensates for the attenuation of signals in a non-loaded transmission line is shown and described in U.S. Pat. No. 3,818,151 granted in the name of C. W. Chambers, Jr. et al on June 18, 1974. Repeater circuits of these types are referred to as amplifying or switched gain type repeaters.

Where it is desired to transmit data rather than voice over a transmission line utilizing such a repeater, it is necessary to disable the repeater prior to the data transmission. The repeater must be disabled in order that the detrimental effect the direction detector has on data transmission may be minimized. Without such disablement the direction detector would slow the transfer of data due to the time the detector circuitry takes to determine the dominant and nondominant parties. Additionally by placing the repeater in a disabled or no gain state during data transmission the repeaters function of providing simultaneously gain to the dominant party and loss to the non-dominant party will be avoided.

The device from which the data is to be transmitted is typically connected to the telephone transmission line by a modulator-demodulator (modem). Prior to the transmission of the data the modem causes a tone of predetermined frequency and duration to be transmitted on the line. The specifications of the Bell operating companies provides, for example, that the tone be in the frequency band of 2,000 Hz to 2,250 Hz and have a duration of at least 400 milliseconds. The tone is usually transmitted in the frequency range of 2,010 Hz to 2240 Hz. Upon sensing of the tone signal, the repeater becomes disabled and remains so disabled during the data transmission until the transmitted signal level falls below a predetermined amplitude for a predetermined interval of time. Upon the termination of data transmission the repeater is enabled to thereby provide simultaneously amplification to the dominant voice frequency party and loss to the nondominant voice frequency party. Thus a data tone responsive disabling circuit must be included in the repeater in order that the repeater be disabled and remain disabled during data transmission.

Data tone responsive disabling circuitry may also be used in conjunction with devices such as echo suppressors which are also used to improve the quality of voice transmission. Echo suppressors are used on those voice communication circuits which have appreciable propagation delay. Echo is suppressed by inserting additional loss in the transmission path to thereby prevent a return echo to the talking party. Echo suppressors utilize data tone disabling circuitry to inhibit the loss insertion circuit to thereby render the echo suppressor transparent to the transmission of data. Thus a data tone responsive disabling circuit must be included in an echo suppressor in order that the suppressor be disabled and remain disabled during data transmission.

One such prior art data tone responsive disabling circuit is that used by Lenkurt Electric Co., Inc. in the Model 931C echo suppressor. The Lenkurt disabler uses a first L-C circuit combination to provide a maximum output voltage if the transmitted signal lies within the tone signal frequency band. A second L-C circuit combination is used to provide a maximum output voltage if the transmitted signal lies outside of the tone signal frequency band. The first and second L-C circuit combinations function, in effect, as band pass and band reject filters, respectively. A Schmitt trigger circuit is used in conjunction with the L-C circuit combinations to provide a signal which disables the loss insertion circuit upon detection of a tone signal.

Another such prior art data tone responsive disabling circuit is that used by Tellabs, Inc. in their Model 7201 repeater. The disabling circuit used therein includes an L-C parallel resonant circuit which functions as a band pass filter for the tone signal. The inductor used in the band pass filter is realized by active filter techniques in that a gyrator circuit is used to simulate the needed value of L. A limiter circuit provides a constant level input signal to the filter. Disabling occurs when the signal output from the filter exceeds the amplitude of those signals which are outside of the filter's band width by a predetermined value.

While each of the circuits described above provides a disabling function for its associated echo suppressor or repeater, it was recognized that inherently more reliable disabling circuitry could be provided by use of the present invention. The present invention utilizes tone signal detection and capture circuitry such as a phase locked loop which provides both a high degree of immunity insuring that signals which are outside of the tone frequency band will not be captured and a characteristic which insures that even varying amplitude signals in the tone frequency band will be captured. The prior art circuits may not necessarily offer the immunity to recognizing signals outside of the tone frequency band as the tone signal and the relative insensitivity to variations in tone signal amplitude that is offered by the present invention. The circuit of the present invention further initiates tone detection only after first determining that the transmission line signal does not contain high amplitude voice frequency signals lying within a critical predetermined band of frequencies.

SUMMARY OF THE INVENTION

In accordance with the present invention there is provided data tone responsive disabling circuitry for disabling prior to the transmission of data on a transmission line those devices which improve the quality of voice frequency signals transmitted over the same line.

More particularly, the tone responsive disabling circuitry includes input signal processing circuitry responsive to the signal transmitted on the line for generating first and second control signals. The first control signal has an amplitude which is a function of the transmitted signal. The second control signal has an amplitude which is a function of the energy in the transmitted signal which lies in a predetermined voice frequency band which is outside of the predetermined frequency of the tone signal. The first and second control signals are out of phase with respect to each other. A comparison circuit generates an enabling output signal when the amplitude of the first signal exceeds the amplitude of the second control signal and a predetermined reference signal. In response to the enabling output signal tone detection and capture circuitry detects and captures the tone signal from the transmission line signal. Upon capture the detection and capture circuitry generates a signal to disable the voice frequency improving device.

DESCRIPTION OF THE PREFERRED EMBODIMENT

Figure 1:
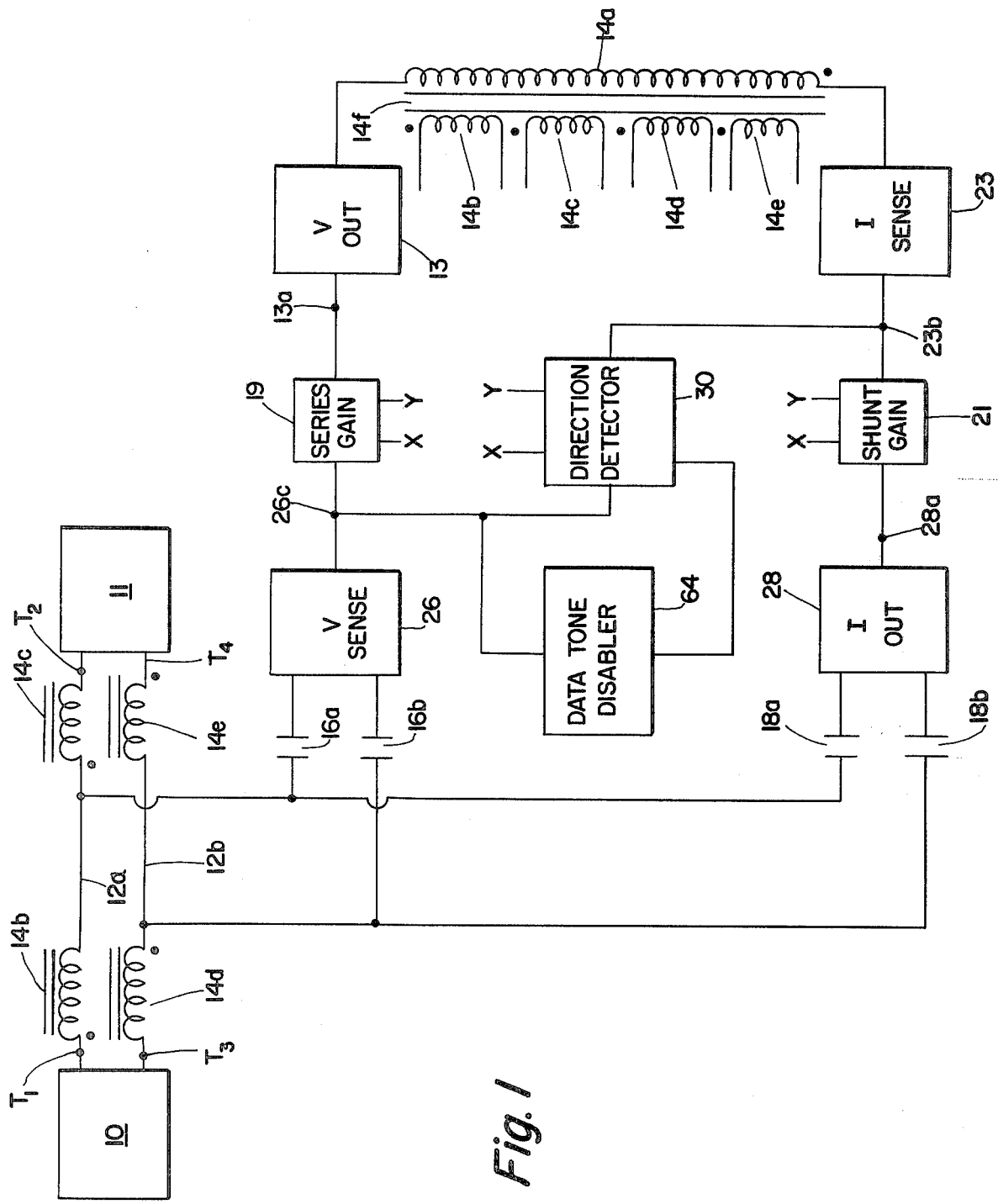
FIG. 1 is a combined block-schematic diagram illustrating the utilization of the circuit of the invention in a typical switched gain repeater.

FIG. 1 is a combined block-schematic diagram which illustrates a typical switched gain type repeater including a data tone responsive disabler circuit 64. The aforementioned U.S. Pat. No. 3,706,862 (hereinafter the '862 Patent) and U.S. Pat. No. 3,818,151 (hereinafter the '151 Patent), the disclosures of which are hereby expressly incorporated herein by reference, show and describe those series and shunt gain or amplifying networks which compensate for the attenuation of signals in loaded and non-loaded transmission lines, respectively. In order to facilitate an understanding of the block-schematic diagram of FIG. 1, the general principles of operation of the gain networks described in the '862 and '151 Patents will be summarized. The operation of data tone responsive disabler circuit 64 will be described in connection with FIGS. 3 and 4.

As described in the '862 and '151 Patents, the connection of an impedance network between the output 26c of voltage sensing means 26 and the input of voltage output means 13 introduces, in series with the transmission line, an amplifying voltage which additively increases (for the dominant talker) the level of signal transmission through the line. As the voltage appearing at input 13a of voltage output means 13 may be either positive or negative, there is both a non-inverting and inverting input terminal at means 13 for the voltage and at any one time only one of the two inputs are used. For ease of illustration only one such input terminal is shown for input 13a.

This amplifying voltage is applied in series with line conductors 12a and 12b through a voltage output connecting means such as transformer 14. If the secondary windings 14b, 14c, 14d and 14e of transformer 14 have substantially equal number of turns, the desired voltage is introduced into the transmission line, between terminal pairs T1-T2 and T3-T4, in substantially equal parts. The amplifying voltage introduced in series with the transmission line varies in accordance with the signal voltage across the transmission line. If, as set forth in the '862 Patent, the ratio of amplifying voltage to signal voltage is independent of frequency, then the frequency independent attenuation of a loaded transmission line may be compensated for. If, as set forth in the '151 Patent, the ratio of amplifying voltage to signal voltage is allowed to vary as a function of frequency, then the frequency dependent attentuation of a non-loaded transmission line may be compensated for.

An impedance network connected between the output 23b of current sensing means 23 and the input of current output means 28 introduces in shunt with the transmission line an amplifying current which additively increases (for the dominant talker) the level of signal transmission through the line. This amplifying current is applied in shunt with line conductors 12a and 12b through an output current coupling device such as capacitors 18a and 18b. As the current appearing at input 28a of current output means 28 may be either positive or negative, there is both a non-inverting and inverting input terminal at means 28 for the current and at any one time only one of the two inputs are used. For ease of illustration only one such input terminal is shown for input 28a.

The amplifying current introduced in shunt with the transmission line varies in accordance with the signal current through the transmission line. If, as set forth in the '862 patent, the ratio of amplifying current to signal current is independent of frequency, then the frequency independent attenuation of a loaded transmission line may be compensated for. If, as set forth in the '151 Patent, the ratio of amplifying current to signal current is allowed to vary as a function of frequency then the frequency dependent attenuation of a non-loaded transmission line may be compensated for.

In both the '860 and '151 Patents, the series and shunt amplifying networks include a network, hereinafter referred to as series and shunt directional control means, each of which comprise two field effect transistors (FET's) and two resistors. The series and shunt amplifying networks are shown in FIG. 1 as series gain and shunt gain networks 19 and 21, respectively. The FET's operate as analog switches which are controlled by signals from a direction detector 30 so as to be either conducting and non-conducting, depending upon the then dominant direction of transmission through the line. The direction detector 30 is connected to the transmission line through voltage sensing means 26 and current sensing means 23 so as to respond to both the signal voltage across and the signal current through the transmission line.

The on-state of the FET which is associated with the non-inverting input terminal of means 13 results in a series-aiding voltage being introduced in series with line conductors 12a and 12b for signals transmitted by station 10 and in a series-opposing voltage being introduced in series with the transmission line for signals transmitted by station 11. This activity is able to proceed substantially independently for the signals of the two parties because of the operation of the superposition principle. Similarly, the on-state of the FET which is associated with the inverting input of means 13 results in a series-aiding voltage being introduced in series with line conductors 12a and 12b for signals transmitted by station 11 and in a series-opposing voltage being introduced in series with the transmission line for signals transmitted by station 10. This activity is able to proceed substantially independently for the signals of the two parties because of the operation of the superposition principle. Thus, while the switched gain repeater circuit of FIG. 1 permits transmission in both directions, it aids the transmission of the dominant party and attenuates the transmission of the non-dominant party.

The on-state of the FET which is associated with the non-inverting input terminal of means 28 results in an additive current being introduced in shunt with line conductors 12a and 12b for signals transmitted by station 10 and a subtractive current being introduced in shunt with the transmission line for signals transmitted by station 11. This activity is able to proceed substantially independently for the signals of the two parties because of the operation of the superposition principle. Similarly, the on-state of the FET which is associated with the inverting input of means 28 results in an additive current being introduced in shunt with line conductors 12a and 12b for signals transmitted by station 11 and a subtractive current introduced in shunt with the transmission line for signals transmitted by station 10. This activity is able to proceed substantially independently for the signals of the two parties because of the operation of the superposition principle. Thus, while the switched gain repeater circuit of FIG. 1 permits transmission in both directions, it aids the transmission of the dominant party and attenuates the transmission of the non-dominant party.

The term "dominant" is used herein to identify the station, in a two-station communication system, which at any given time, transmits a signal having a greater amplitude than that of the other station. The term "dominant" is applicable whether the greater amplitude arises because of the absence of transmission by the other station, or because of the simultaneous transmission by that other station of a signal of lower amplitude.

To compensate for the frequency dependent attenuation of non-loaded transmission lines, frequency-dependent impedances are utilized in conjunction with the directional control FET's. As described in the '151 Patent, the frequency dependent impedances may include a tank circuit comprising a capacitor and an inductor, and two resistors each of which may be made adjustable. By selecting the capacitor and inductor to be resonant at a frequency substantially equal to the highest frequency in the transmission band and by selecting resistors to provide proper "Q" for the tank, a frequency dependent or peaking characteristic is produced. This frequency dependent characteristic varies the series and/or shunt gain with the frequency of the transmitted signal to counteract the frequency of the transmitted signal to counteract the frequency dependent attenuation characteristic of the non-loaded transmission line.

Figure 2:
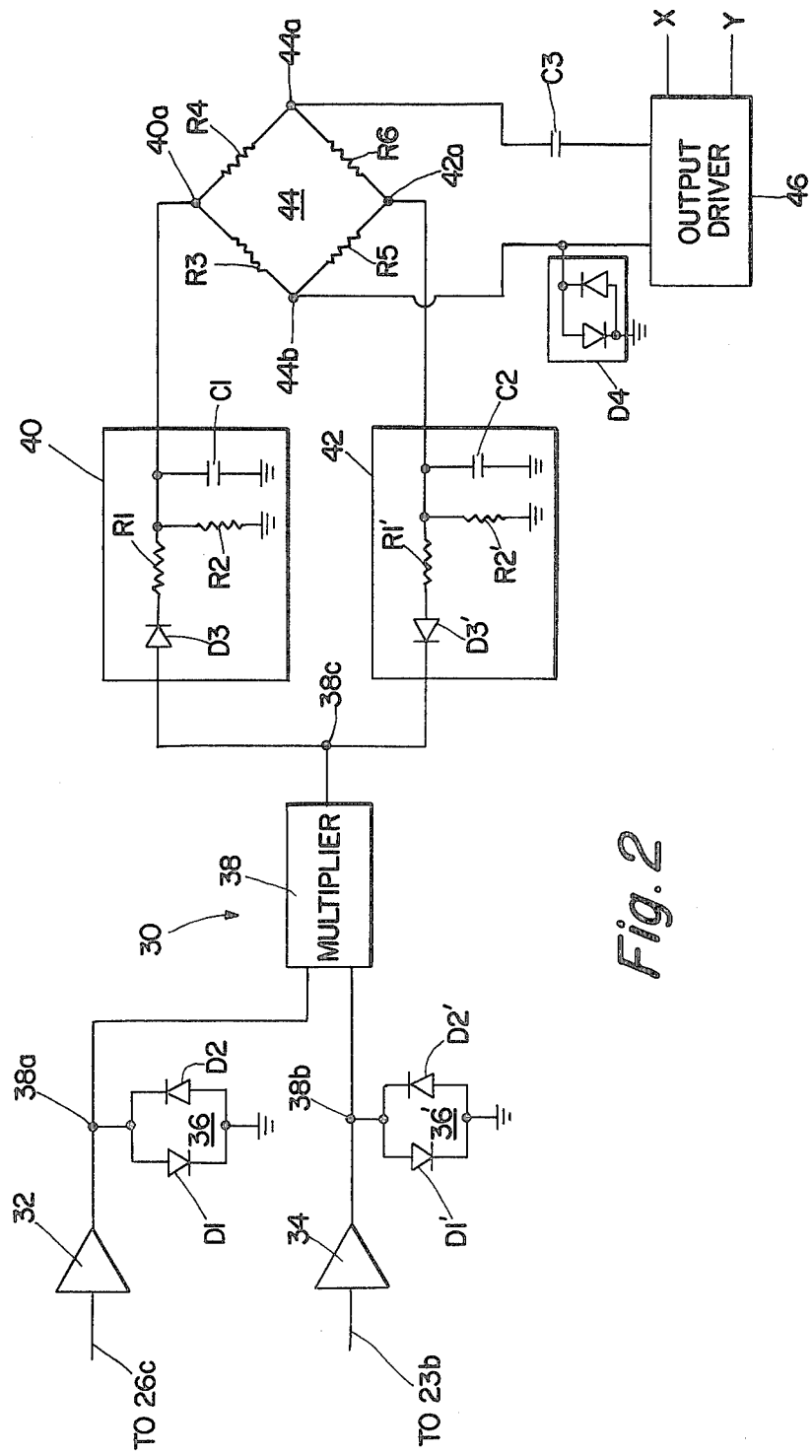
FIG. 2 is a schematic diagram of an exemplary embodiment of the direction detector shown in FIG. 1.

Referring to FIG. 2, there is shown a schematic diagram of an exemplary embodiment for direction detector 30.

The direction detector includes first and second preamplifiers 32 and 34, which are responsive, respectively, to the signal generated at output 26c of voltage sensing means 26 and the signal generated at output 23b of current sensing means 23. When the input signal to each of preamplifiers 32 and 34 is below a predetermined threshold the preamplifier will not be activated. The threshold voltage is selected such that the direction detector does not respond to noise on the transmission line. When the input signal to each of preamplifiers 32 and 34 exceeds the predetermined threshold the output is clamped to a predetermined voltage by the associated diode network 36 and 36' which are identical in structure. The output of preamplifier 32 is connected to input 38a of multiplier 38 and the output of preamplifier 34 is connected to input 38b of multiplier 38.

Multiplier 38 operates so as to provide an output which is proportional to the magnitude of the input signals from preamplifiers 32 and 34, and whose polarity is equal to the product of the polarities of the signals from preamplifiers 32 and 34. In absence of any transmission by station 10 and station 11 the output of multiplier 38 has a magnitude of zero. When the voltage across the transmission line, $V_T$ and the current through the transmission line, $I_T$ are in phase the output voltage of the multiplier has a positive polarity. When the voltage $V_T$ and the current $I_T$ are 180° out of phase the output voltage of the multiplier has a negative polarity. The voltage and current being in phase indicates that one party either station 10 or station 11 is dominant and that the other party either station 11 or station 10 is non-dominant. Similarly, the voltage and current being 180° out of phase indicates dominancy by one party (either station 11 or station 10) and non-dominancy by the other party (either station 10 or station 11).

When both parties are transmitting above the threshold and at equal loudness the transmission line voltage, $V_T$, and transmission line current, $I_T$, are 90° out of phase. The output of the multiplier then alternates in polarity from plus to minus or minus to plus at least once during each cycle. If the signals utilized to switch the FET's contained in the series and shunt amplifying networks were taken directly from the output of the multiplier, the FET's would each for equal loudness by both parties switch on and off at least once during each cycle. Such switching is objectionable as the FET's should only be switched when aiding the dominant party and not when neither party is dominant.

To avoid the problems described above and provide other benefits to be described below, the output signal of multiplier 38 is then coupled to positive and negative rectifying networks 40 and 42, respectively. Networks 40 and 42 are identical in structure and operate in a similar fashion, the only difference being that network 40 operates on signals of positive polarity from multiplier 38, whereas network 42 operates on signals of negative polarity from multiplier 38. Networks 40 and 42 each contain an R-C circuit combination which operates in a manner so as to allow for both quick turn on and slow turn off of the FET's comprising a given directional control means. Quick turn on is necessary so as to provide immediate gain to the newly dominant party to thereby avoid missing syllables. Slow turn off is usually desirable to avoid turning off a FET in between syllables of the dominant party.

The outputs of networks 40 and 42 are coupled at terminals 40a and 42a, respectively, to resistive network 44. Network 44 which is comprised of resistors R3, R4, R5 and R6 provides outputs at terminals 44a and 44b which are equal to the sum of the outputs of rectifying networks 40 and 42. Output 44b provides a signal input to driver 46 which is just sufficient in amplitude to turn on either of the FET's. The signal from output terminal 44b is prevented from rising further in amplitude by the clamping action of diode D4. The signal on output terminal 44a is coupled to driver 46 through capacitor C3. Capacitor C3 operates in a manner so as to provide a signal which is a function of the rate of change between the outputs of networks 40 and 42. This signal operates so as to overcome the normally slow turn off of the FET's so as to provide a quick turn off of the on FET, such that the off FET may then be turned on quickly. A quick turn off of the on FET is needed, where with one party dominant, the signal strength of the non-dominant party rises rapidly, thereby indicating that the non-dominant party will within a very short period of time become dominant.

Thus, the exemplary embodiment of FIG. 2 has shown a direction detector which operates in a manner such that gain is always provided to the dominant party and loss is always provided to the non-dominant party.

Figure 3:
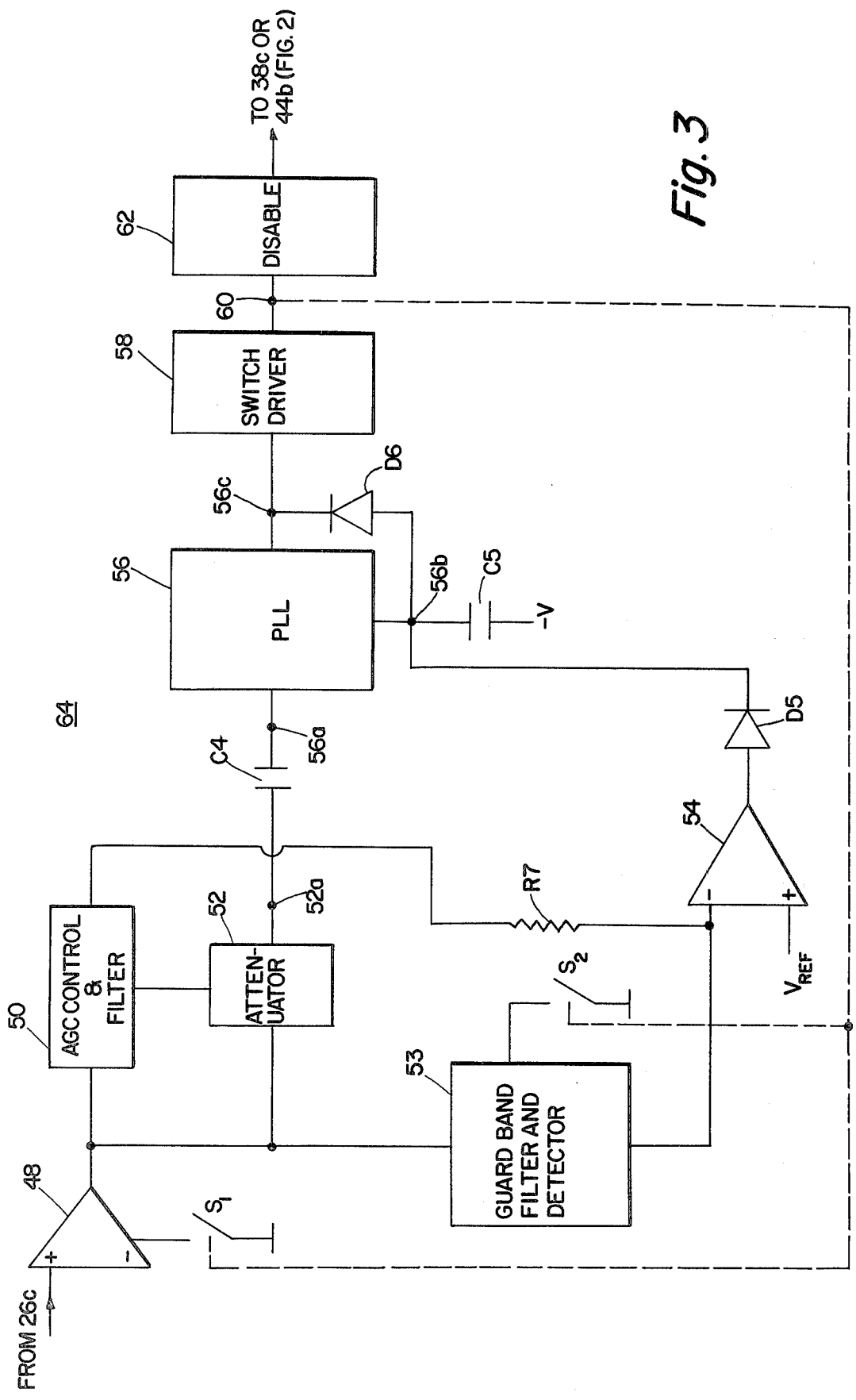
FIG. 3 is a combined block-schematic diagram illustrating one embodiment of the invention.

Referring to FIG. 3 there is shown a combined block-schematic diagram which illustrates an embodiment of the data tone responsive disabler circuit 64 for use in a switched gain repeater according to the present invention. The circuit 64 has its input connected to output 26c of voltage sensing means 26 (FIG. 1). The circuit functions in a manner as will be described below such that in response to a transmission line tone signal having a predetermined frequency, amplitude and minimum duration a control signal is generated at the circuit output which disables direction detector 30. The disablement of the direction detector places the repeater in a no gain state to thereby allow the transmission of data without detrimental affect. The disablement of the direction detector continues for as long as the tone signal of predetermined frequency and amplitude remains on the transmission line. The output of circuit 64 may be connected to either terminal 38c or 44b of direction detector 30 (FIG. 2). Connection to either terminal will provide disablement of the direction detector.

The signal representative of the voltage across the transmission line which is developed at output 26c of voltage sensing means 26 is applied through amplifier 48 to AGC control circuit 50 and attenuator 52. The voltage on the transmission line may vary in amplitude over a wide range and therefore the voltage signal from output 26c of voltage sensing means 26 will also vary over a wide range. AGC control 50 functions in a manner so as to generate a d-c control voltage whose amplitude is a function of the amplitude of the transmission line signal voltage. The control voltage has a positive amplitude when the transmission line signal voltage exceeds a predetermined amplitude, typically in the order of −30 dbm.

Attenuator 52 functions in response to the output of amplifier 48 and the d-c control voltage generated by AGC control circuit 50 to provide at attenuator output 52a a voltage whose amplitude does not rise above a predetermined maximum level. As will be described below the attenuator output voltage level is limited in the above manner in order to prevent false lock-up of phase locked loop (pll) 56.

The positive d-c control voltage generated by AGC circuit 50 is connected to the inverting input of operational amplifier 54 by resistor R7. The inverting input of amplifier 54 is also connected to the output of guard band circuit 53. Guard band filter circuit 53 functions in a manner to detect signals on the transmission line which are in the frequency band of 300 to 1500 hertz. In order that circuit 64 may provide an output which results in the disablement of direction detector 30 a tone signal of predetermined amplitude and minimum duration having a frequency in the frequency band of 2000 to 2250 hertz must be transmitted on the transmission line and detected by circuit 64. Such a tone is normally transmitted prior to and during the transmission of data and only after voice transmission has been completed. In normal voice transmission signals having frequencies in the band from 2000 to 2250 hertz and in addition having the predetermined amplitude and minimum duration may occur. Guard band circuit 53 insures that even if such signals occur circuit 64 will not function in a manner to disable direction detector 30.

In the transmission of speech, most of the energy occurs predominantly in the 300 to 1500 hertz frequency band. A third harmonic of the transmitted voice may have sufficient energy to cause circuit 64 to disable direction detector 30. Guard band circuit 53 also insures that circuit 64 will not respond to harmonics of the transmitted voice.

Transmission line signals occurring in the 300 to 1500 hertz frequency band cause guard band circuit 53 to generate a negative d-c control voltage to the inverting input terminal of amplifier 54. The negative control voltage overrides the positive control voltage generated at the inverting input terminal by AGC control circuit 52 to thereby prevent circuit 64 from disabling the direction detector. Thus guard band circuit 53 insures that direction detector 30 will not be disabled during normal voice transmission even if tones in the predetermined frequency band having the predetermined amplitude and minimum duration occur.

When voice transmission ceases and a tone signal is transmitted on the transmission line in the 2000 to 2250 hertz frequency band, guard band filter circuit 53 ceases to generate a negative d-c control voltage. The positive d-c control voltage generated by AGC circuit 50 will therefore not be overridden at the inverting input of amplifier 54. The noninverting input of amplifier 54 is connected to a reference voltage, VREF, which represents a predetermined amplitude of signal on the transmission line typically in the order of −30 dbm. In the absence of the negative control voltage generated by guard band circuit 53, amplifier 54 functions as a comparator to compare the positive control voltage from AGC circuit 50 with VREF. If the tone signal on the transmission line has an amplitude above VREF, the output of amplifier 54 goes low to thereby provide through gating diode D5 a signal to the locking input 56b of pll 56. Thus amplifier 48 in combination with AGC control circuit 50, attenuator 52 and guard band circuit 53 function in a manner to process the transmission line signal voltage to insure that a true tone signal is present on the line and amplifier 54 functions in a manner to compare that true tone signal to a predetermined reference level.

Phase locked loop 56 has its input 56a coupled by a capacitor C4 to the output of attenuator 52. The output of attenuator 52 is limited to a predetermined maximum amplitude in order to further insure that pll 56 does not falsely lock on harmonics of transmission line signals that fall inside the predetermined tone frequency band. Locking input 56b of pll 56 is connected to the output of amplifier 54 by diode D5 and to a capacitor C5 which in turn is connected to source of voltage, V. Capacitor C5 determines the locking time of pll 56. In order that pll 56 may lock on the desired tone the signal at input 56a must be present for the minimum duration determined by capacitor C5. Should the tone cease prior to the time duration determined by C5 lock will not be acquired. Further, if voice transmission should reoccur on the transmission line prior to time out of C5 and thereby overlap with the tone signal guard band circuit 53 will insure that pll 56 does not acquire lock. Thus, pll 56 will lock on a transmitted tone signal having a predetermined frequency, amplitude and minimum duration.

Upon acquiring lock, output 56c of pll 56 goes low. Diode D6 having its anode connected to pll output 56c and its cathode connected to pll input 56b provides latching for pll 56. The latching provided by diode D6 insures that pll 56 operates in a wide band mode and remains latched as long a tone signal having a frequency in the predetermined band and of predetermined amplitude is transmitted on the line. Upon cessation of the tone signal at the end of data transmission pll 56 becomes unlatched upon the time out of the duration determined by capacitor C5.

When phase locked loop 56 acquires lock and its output 56c goes low, switch driver 58 coupled thereto provides a signal at junction 60 which causes switches S1 and S2 to close. As will be described in connection with FIG. 4 switch S1 upon closure increases the gain of amplifier 48 to thereby provide hysteresis and prevent circuit instability. Switch S2, as shown in more detail in FIG. 4, upon closure inhibits the operation of guard band circuit 52 to thereby switch circuit 64 to wide band operation. The output signal of switch driver 58 also operates disabler circuit 62 which provides the disabling signal to either terminal 38c or 44b of direction detector 30. Thus upon detection by circuit 64 of a tone signal having a predetermined frequency, amplitude and minimum duration, direction detector 30 will be disabled.

Phase locked loop 56 may be implemented by Signetics chip type NE 567N, driver circuit 58 may be implemented by a transistor which saturates upon the output of the phase locked loop going low and disable circuit 62 may be implemented by a field effect transistor (FET) which turns on upon the saturation of the switch driver transistor.

Figure 4:
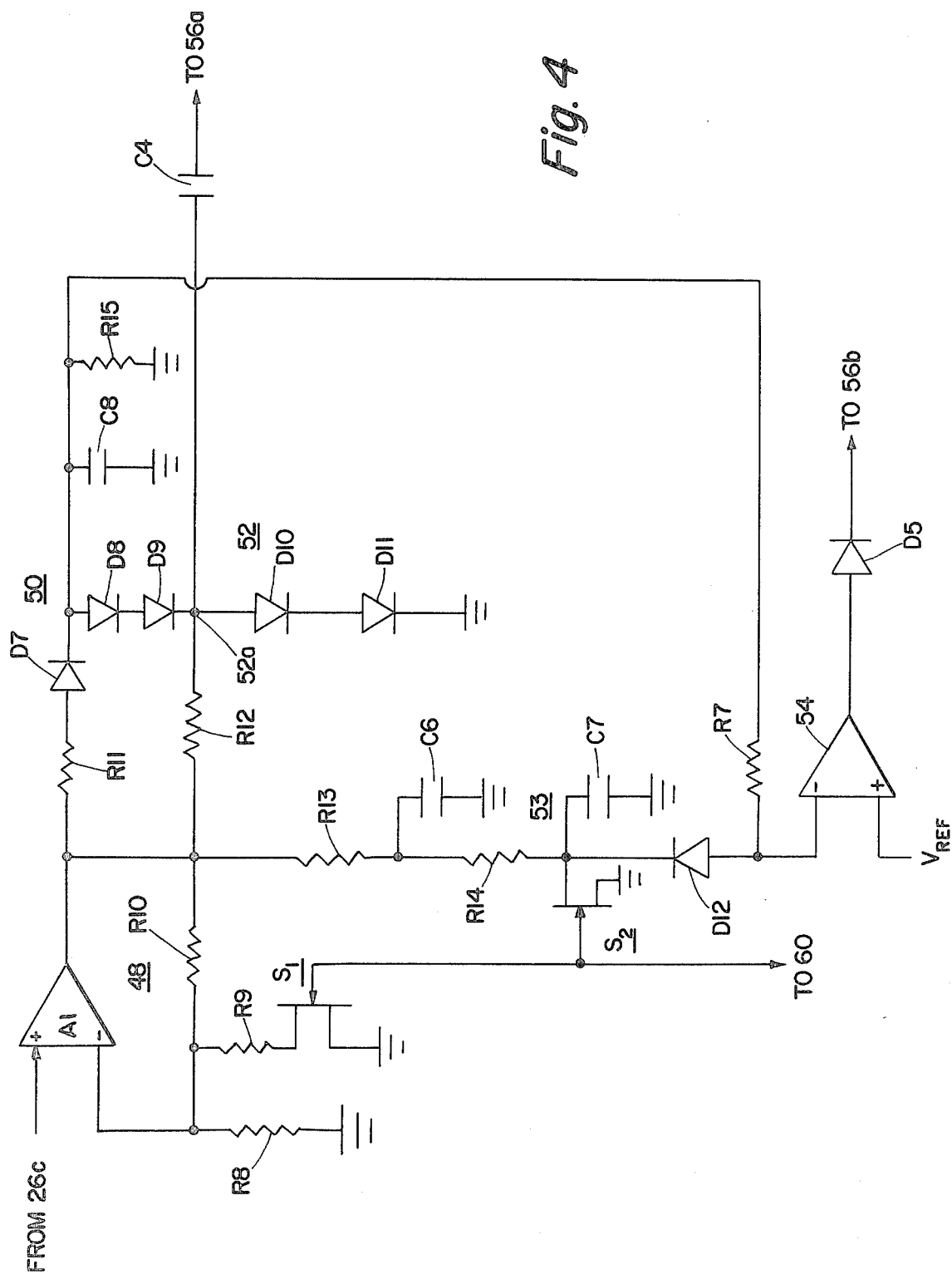
FIG. 4 shows detailed circuit schematics for the amplifier, AGC circuit, attenuator, and guard band filter of the embodiment of FIG. 3.

Referring to FIG. 4 there is shown an exemplary circuit embodiment for amplifier 48, AGC control circuit 50, attenuator 52 and guard band filter 53 of FIG. 3.

Amplifier 48 includes operational amplifier A1 having its noninverting input terminal connected to output 26c of voltage sensing means 26. The inverting input terminal of A1 is connected to the amplifier's output by resistor R10 and to ground by resistor R8. The series combination of resistor R9 and FET S1 is also connected between the inverting input terminal and ground in a manner so as, upon the operation of FET S1, to be in parallel relationship with resistor R8. FET S1 operates as an analog switch having its control input connected to the junction 60 between switch driver 58 and disable circuit 62.

In the absence of a tone signal on the transmission line of predetermined frequency, amplitude and minimum duration switch S1 is open and the gain of amplifier 48 is a function of the ratio of the resistance of resistor R10 to the resistance of resistor R8. Upon transmission of a tone signal having the required parameters and detection thereof by data tone disabler 64, junction 60 goes low causing switch S1 to close. Closure of switch S1 results in resistor R9 being placed in parallel with resistor R8 thereby changing the gain of amplifier 48 to be a function of the ratio of the resistance of resistor R10 to the resistance of the parallel combination of resistors R8 and R9. As the resistance of the parallel combination is less than the resistance of resistor R8, the gain of amplifier 48 increases upon closure of switch S1.

The increased gain of amplifier 48 is necessary in order to provide hysteresis and prevent circuit instability upon detection of the tone signal and disablement of the direction detector 30. During the process of detecting of the tone signal the switched gain repeater of FIG. 1 is aiding the transmission of the dominant party (the tone signal) and attenuating the transmission of the non-dominant party. Upon detection of the tone signal by data tone disabler 64, the repeater's direction detector is disabled thereby no longer providing gain to the transmission line. The tone signal level into the noninverting input terminal of A1 may then drop below the predetermined amplitude level. This drop in tone signal level may then cause data tone disabler 64 to respond in the same fashion as if transmission of the tone signal had ceased. Direction detector 30 would then be enabled to thereby provide gain to the tone signal. The switched gain repeater may then oscillate between enablement and disablement of the direction detector. Closure of switch S1 upon detection of the tone signal avoids such problems by increasing the gain of amplifier 48 to thereby compensate for the loss of gain resulting from the disablement of direction detector 30.

AGC control circuit 50 includes the series combination of resistor R11 and diode D7 which is connected between the output of amplifier 48 and one of the inputs to attenuator 52. Circuit 50 generates through rectifier diode D7 a positive d-c control voltage when the signal voltage on the transmission line exceeds the predetermined amplitude. Capacitor C8 and resistor R15 provide filtering for the control voltage. The filtered control voltage is connected to the inverting input of amplifier 54 by resistor R7.

Attenuator 52 comprises the series combination of diodes D8, D9, D10 and D11. Diode D8 has its cathode connected to the anode of diode D7 and receives the unfiltered positive d-c control voltage generated by AGC circuit 50. The anode of diode D8 is connected to the cathode of diode D9, the anode of D9 being connected to the cathode of diode D10. Diodes D10 and D11 are connected in series in the same manner as the series connection of diodes D8 and D9 with the anode of D11 being connected to ground. The output of amplifier 48 is connected by resistor R12 to the junction of the anode of diode D9 and the cathode of diode D10 which in turn is coupled by capacitor C4 to input of 56a of p11 56. The diodes D8 to D11 function in a manner so as to prevent the voltage at input 56a from rising above a predetermined maximum level. The particular level is determined by the characteristics of the p11. As the signal voltage on the transmission line increases in amplitude the positive d-c control voltage generated by diode D7 increases in amplitude. As the voltage generated by diode D7 increases in amplitude the bias current supplied to diodes D8 to D11 increases thereby increasing the conduction of these diodes. The more diodes D8 to D11 conduct the lower their forward resistance becomes thereby providing a voltage divider action which limits the voltage at input 56c of p11 56.

Guard band circuit 53 includes a two section low pass filter, formed by resistors R13 and R14 and by capacitors C6 and C7, and the rectifier formed by diode D12. The low pass filter is tuned to pass transmission line signals in the frequency band of 300 to 1500 hertz. Resistor R13 of the filter has one end connected to the output of amplifier 48 and the other end connected to ground by capacitor C6 and to the anode of rectifier diode D12 by resistor R14. As a result of the filtering provided by the low pass filter, diode D12 generates a frequency dependent negative d-c control voltage to the inverting input of amplifier 54. For voice transmission the transmission line signal voltage contains a substantial portion of its energy below 1500 hertz and the negative d-c control voltage generated by diode D12 is quite large. When a tone signal falling in the frequency band of 2000 to 2250 hertz is transmitted on the transmission line the low pass filter prevents diode D12 from generating a negative d-c control voltage in response thereto.

A FET S2 is connected between the anode of diode D12 and ground. The control input of the FET is connected to the junction 60 between switch driver 58 and disabler circuit 62 of FIG. 3. FET S2 operates as an analog switch and conducts to thereby disable diode D12 upon the detection by data tone disabler 64 of the toner signal. Thus, upon detection of the tone signal by circuit 64, guard band circuit 53 is disabled. The guard band circuit will be enabled upon the cessation of the tone signal.

Representative component values and types for the circuit elements comprising the exemplary embodiment of FIG. 4 and capacitor C5 and diode D6 of FIG. 3 are given below:

R7 = $10 \times 10^3$ ohms
R8 = $10 \times 10^3$ ohms
R9 = $3.32 \times 10^3$ ohms
R10 = $100 \times 10^3$ ohms
R11 = $8.2 \times 10^3$ ohms
R12 = $10 \times 10^3$ ohms
R13 = $1 \times 10^3$ ohms
R14 = $10 \times 10^3$ ohms
R15 = $10 \times 10^3$ ohms
C4 = 2200 pf
C5 = 33 uf
C6 = 0.22 uf
C7 = 0.022 uf
C8 = 2.2 uf
Diodes $D_5$ to D12 are type 1N4148

While the data tone responsive disabler circuit of the present invention has been described in connection with a switched gain repeater it should be appreciated that the circuit may also be used in conjunction with other devices such as echo suppressors which are used to improve the quality of voice transmission on a transmission line. The only requirements for use of the data tone responsive disabler circuit are the desire to transmit data on the line and therefore render the repeater or echo suppressor, for example, transparent for the data transmission and the connection of the disabler to the voice transmission improving device in a manner such that the input signal to the disabler is representative of the signal on the transmission line and that the output of the disabler be coupled to the device in a manner so as to disable during data transmission those functions of the device which improve the quality of voice transmission.

It is to be understood that the description of this preferred embodiment is intended to be only illustrative, rather than exhaustive, of the present invention. Those of ordinary skill will be able to make certain additions, deletions, and/or modifications to embodiments of the disclosed subject matter without departing from the spirit of the invention or its scope, as defined by the appended claims.

What is claimed is:

1. A circuit for disabling a device connected to a transmission line, said device improving a voice frequency signal transmitted on said line, said circuit responsive to a tone signal transmitted on said line having a predetermined amplitude and a frequency falling within a predetermined frequency band of said voice frequency signal comprising:
   (a) signal processing means for generating an enabling output signal when the amplitude of a first control signal exceeds the amplitude of a second control signal and a reference signal wherein said signal processing means is responsive to said signal transmitted on said transmission line for generating said first control signal having an amplitude which is a function of the total energy of said transmission line signal and said second control signal having an amplitude which is a function of the energy in said transmission line signal which lies in a predetermined band of frequencies which are outside of said tone signal frequency band; and
   (b) tone signal detection and capture means responsive to both said transmission line signal and said enabling signal for detecting and capturing said tone signal and generating upon capture a disabling signal whereby said device is disabled.

2. The disabling circuit of claim 2 wherein said signal processing means includes first processing means responsive to said transmission line signal for generating said first and second control signals.

3. The disabling circuit of claim 2 wherein said signal processing means further includes second processing means responsive to said first and second control signals and said reference signal for generating said enabling signal.

4. The disabling circuit of claim 3 wherein said second processing means includes means for comparing the amplitude of said first control signal to the amplitudes of said second control signal and said reference signal.

5. The disabling circuit of claim 2 wherein said first processing means includes automatic gain control means responsive to said transmission line signal for generating said first control signal.

6. The disabling circuit of claim 5 wherein said first processing means further includes filtering and detecting means responsive to said transmission line signal for generating said second control signal.

7. The disabling circuit of claim 6 wherein said first processing means further includes switching means coupled to said filtering and detecting means said switching means responsive to said disabling signal for disabling the generation of said second control signal.

8. The disabling circuit of claim 1 wherein said first and second control signals are d.c. signals.

9. The disabling circuit of claim 1 wherein said tone detection and capture means includes:
    (a) phase locked loop means responsive to said transmission line signal and said enabling signal for capturing said tone signal and generating a tone captured output signal; and
    (b) disabler means responsive to said tone captured output signal for generating said disabling signal.

10. A circuit for disabling, in response to a tone signal having a predetermined amplitude and frequency transmitted on a transmission line, a device connected to said transmission line for improving voice signals transmitted on said line comprising:
    (a) input signal processing means responsive to the signal transmitted on said line for generating a first control signal having an amplitude which is a function of said transmitted signal and a second control signal having an amplitude which is a function of the energy in said transmitted signal which lies in a predetermined voice frequency band outside of the predetermined frequency of said tone signal, said second control signal being opposite in phase to said first control signal;
    (b) means responsive to said first and second control signals and a reference signal having a predetermined amplitude for generating an enabling output signal when the amplitude of said first control signal exceeds the amplitudes of said second control signal and said reference signal; and
    (c) tone detection and capture means responsive to said signal transmitted on said line and to said enabling signal for detecting and capturing said tone signal and generating upon capture a disabling signal whereby said voice signal improving device is disabled.

11. The disabling circuit of claim 10 wherein said input signal processing means includes filtering and detecting means responsive to said transmission line signal for generating said second control signal.

12. The disabling circuit of claim 11 wherein said signal processing means further includes switching means coupled to said filtering and detecting means, said switching means responsive to said disabling signal for disabling the generation of said second control signal.

13. The disabling circuit of claim 10 wherein said input signal processing means includes automatic gain control means responsive to said transmission line signal for generating said first control signal.

14. The disabling circuit of claim 10 wherein said tone detection means includes:
    (a) phase locked loop means responsive to said signal transmitted on said line and said enabling signal for capturing said tone signal and generating a tone captured output signal; and
    (b) disabler means responsive to said tone captured output signal for generating said disabling signal.

15. The disabling circuit of claim 10 wherein said input signal processing means includes:
    (a) automatic gain control means responsive to said transmission line signal for generating said first control signal; and
    (b) filtering and detecting means responsive to said transmission line signal for generating said second control signal.

16. The disabling circuit of claim 15 wherein said input signal processing means further includes switching means coupled to said filtering and detecting means, said switching means being responsive to said disabling signal for disabling the generation of said second control signal.

17. The disabling circuit of claim 16 wherein said switching means is a field effect transistor.

18. The disabling circuit of claim 15 wherein said tone detection means includes:
    (a) phase locked loop means responsive to said signal transmitted on said line and said enabling signal for capturing said tone signal and generating a tone captured output signal; and
    (b) disabler means responsive to said tone captured output signal for generating said disabling signal.

19. The disabling circuit of claim 16 or 18 wherein said filtering and detecting means further includes a filter tuned to pass transmission line signals having frequencies within said predetermined voice frequency band.

20. The disabling circuit of claim 19 wherein said predetermined voice frequency band is from 300 to 1500 Hertz.

21. In a disabler circuit for use with a device connected to a transmission line for improving a voice frequency signal transmitted on said line; said disabler circuit including means responsive to a signal indicative of the presence of a tone signal having a predetermined frequency band on said transmission line for capturing said tone signal to thereby disable said voice frequency signal improving device the combination comprising:
    (a) first signal processing means responsive to said voice frequency signal for generating a first control signal having an amplitude which is a function of the total energy in said signal;
    (b) second signal processing means responsive to said voice frequency signal for generating a second control signal having an amplitude which is a function of the energy in said signal which lies in a predetermined band of frequencies which are outside of said predetermined tone signal frequency band said first and second control signals being opposite in phase to each other; and
    (c) third signal processing means responsive to said first and second control signals and a reference signal having a predetermined amplitude for generating said indicative signal when the amplitude of said first control signal exceeds the amplitude of said second control signal and said reference signal.

22. The combination of claim 21 wherein said first signal processing means is an automatic gain control circuit for generating said first control signal.

23. The combination of claim 21 or 22 wherein said second signal processing means comprises low pass filter means responsive to said signal for generating therefrom a signal having frequencies lying substantially only in said predetermined frequency band and rectifier means responsive to said filter means signal for generating said second control signal.

24. The combination of claim 23 wherein said third means includes amplifier means having first and second inputs and an output said first input connected to receive said first and second control signals and said second input connected to receive said reference signal said amplifier means generating at said output said indicative signal.

* * * * *